United States Patent Office 2,814,628
Patented Nov. 26, 1957

2,814,628

PROCESS FOR THE PREPARATION OF ETHYLENE OXIDE

Ralph Landau, East Hills, and Alfred Saffer, Bayside, N. Y., assignors to Chempatents, Inc., New York, N. Y., a corporation of Delaware No Drawing. Application April 29, 1954, Serial No. 426,562

2 Claims. (Cl. 260—348.5)

This invention relates to processes for the preparation of ethylene oxide by the partial oxidation of ethylene by means of gaseous oxygen in the presence of a silver-containing catalyst, and more particularly to such a process wherein a small proportion of a volatile organic fluorine-containing compound is provided in the reaction zone to avoid or suppress the excessive formation of carbon dioxide in the process. The invention relates especially to such a process wherein from about 0.5 to 500 p. p. m. (parts per million) of a fluoro organic compound boiling above 400° C. at an atmospheric pressure and, preferably one having about 15 to 30 carbon atoms in the molecule, is provided, on a mol basis of the gaseous mixture.

The preparation of ethylene oxide by the partial oxidation of ethylene by means of gaseous oxygen in the presence of a silver-containing catalyst is known, and such processes have achieved noteworthy commercial success.

The commercial operation of these processes requires rather careful control in order to avoid undesirable side effects, one of the most important of which is the avoidance of overheating which is associated with excessive formation of carbon dioxide. This results in loss of ethylene feed or ethylene oxide desired product and may even ruin the catalyst. The latter effect might necessitate shutting down the plant and replenishing the catalyst.

A major problem confronting the art is the improvement of the control of the foregoing processes, and especially the avoidance or suppression of excessive formation of carbon dioxide.

It has been found in accordance with the invention that the provision of a small proportion of a volatile organic fluorine-containing compound in the reaction zone avoids or suppresses the excessive formation of carbon dioxide in the partial oxidation of ethylene by means of gaseous oxygen in the presence of a silver-containing catalyst.

The objects achieved in accordance with the invention as described herein include the provision of a process for suppressing or avoiding excessive formation of carbon dioxide in the partial oxidation of ethylene by means of gaseous oxygen in the presence of a silver-containing catalyst, by providing in the reaction zone a small proportion of a volatile organic fluorine-containing compound; the provision of such a process wherein the gaseous reaction mixture contains from about 0.01 to 500 p. p. m. of the organic fluorine-containing compound; the provision of such a process wherein the organic fluorine compound contains about 15 to 30 carbon atoms in the molecule; the provision of such a process wherein the organic fluorine compound is a polymer of trifluoro chloro ethylene, having a lubricating oil consistency; the provision of such a process wherein the organic fluorine compound has an approximate molecule formula of $C_{21}F_{44}$; and other objects which will be apparent as details or embodiments of the invention are set forth hereinafter.

In order to facilitate a clear understanding of the invention, the following preferred specific embodiments are described in detail.

*Example 1*

A vertical stainless steel tubular reactor of about 1" diameter and about 42" in height, surrounded by a temperature regulating liquid bath, such as diphenyl ether, or a hydrogenated or a partially hydrogenated aromatic compound, is filled with a silver-containing catalyst.

This catalyst is prepared by mixing an aqueous solution of silver nitrate with a slight stoichiometric excess of aqueous sodium hydroxide, settling, and thoroughly washing the silver oxide precipitate. An aqueous solution of barium lactate or calcium lactate is added thereto, to provide about 5 to 6% of barium or calcium relative to the mols of silver therein. Approximately ⅜" spheres of mullite having a roughened outer surface and a substantially non-porous core, and freshly washed with water, are then added to the above mixture. The resulting mixture is evaporated slowly, with slow stirring, until each sphere is well coated with the slurry. Then the coated spheres are dried, e. g., at about 105–110° C. for about 4 to 10 hours, and then roasted at about 330 to 400° C. for about 1 to 5 hours.

A gaseous reaction mixture containing 5% ethylene by volume, 6% oxygen and the remainder inerts, mainly nitrogen, is passed through the tube at about 100 liters per hour (measured at atmospheric pressure and about 27° C.) at a temperature of about 233° C.

Under these conditions the outlet gases contain 0.74% ethylene oxide and 0.80% carbon dioxide.

Then, while the gas feeding is continued, there is added to the gaseous mixture a high boiling polytrifluorovinyl chloride having a vapor pressure at 216° C. of 0.075 mm. Hg at a rate to provide 100 p. p. m. thereof in the gaseous mixture (by bubbling the inlet gas through the molten material). After 1 hour of such addition, the outlet gas contained only 0.06% ethylene oxide and a correspondingly low carbon dioxide content. This clearly shows that the added material has a high inhibiting effect.

In the normal production of ethylene oxide by this method, only about 0.01 to 50 p. p. m. of the additive would be used, the lower amounts for highest purity ethylene, and the higher amounts for an ethylene containing a higher tolerable amount of paraffin type impurities. In this way a maximum output of ethylene oxide is obtained with a minimum of undesirable carbon dioxide formation.

*Example 2*

The above procedure is repeated except that the additive used is a material having an average composition of $C_{21}F_{44}$ and a boiling range of 130 to 240° C. at 10 mm. Hg. With the system operating at 268° C., and an outlet ethylene oxide concentration of 0.84%, addition of this material at the rate of 1000 p. p. m. of the gaseous mixture for 0.7 hour gave a resulting outlet gas containing 0.22% ethylene oxide. These results clearly show that this material is a very effective inhibitor.

In the normal production of ethylene oxide by this method, only about 0.01 to 50 p. p. m. of the additive would be used, the lower amounts for highest purity ethylene, and the higher amounts for an ethylene containing a higher tolerable amount of paraffin-type impurities. In this way a maximum output of ethylene oxide is obtained with a minimum of undesirable carbon dioxide formation.

Desirable results are achieved with various modifications of the foregoing examples, such as the following. The additive may be any high boiling fluorine-containing compound resistant to oxidation in the system having a sufficient volatility, so that the desired amount thereof may be provided in the reaction zone, e. g., 0.01 to 200 p. p. m. on a mol basis of the gaseous mixture, desirably up to 100, and preferably up to 50, if fed continuously in the gaseous mixture. However, higher amounts, e. g., up to 3000 p. p. m. may be used if fed intermittently, so that the average amount fed falls within the above range. Mixtures thereof may be used. Desirably, the additive should not cause permanent damage to the catalyst.

The catalyst employed in the foregoing examples is regarded as particularly effective and desirable. Other silver-containing catalysts may be used however, such as those known to the art.

The feed gas may be any suitable reaction mixture for preparing the desired ethylene oxide, preferably it may contain from about 3 to about 8% ethylene, 6 to 8% oxygen, and the remainder is inert gas, e. g., up to about 10% carbon dioxide and the remainder nitrogen. Air may be used to provide the oxygen. The reaction may be conducted at temperatures in the range of about 150 to 400° C., preferably about 225 to 300° C. If desired, the reaction may be conducted under pressure, e. g., up to about 25 or more atmospheres. The reaction mixture, temperature, catalyst, and contact time or space velocity of the gaseous mixture are interrelated and suitable combinations thereof are selected to give the desired optimum output and concentration of ethylene oxide in the exit gas.

Inasmuch as the desired formation of ethylene oxide is only one of the many reactions or effects which may occur upon subjecting the mixture of ethylene and oxygen to contact with the catalyst at elevated temperatures, it has been regarded as convenient to refer to the percentage of ethylene consumed in forming ethylene oxide relative to the feed as "conversion," and the percentage of ethylene oxide formed relative to the ethylene consumed as "selectivity." The yield of ethylene oxide relative to the ethylene feed is the product of the "selectivity" times the "conversion," e. g., on a mol basis. These effects and terms may be represented as follows:

Ethylene plus oxygen gives:
  A. Ethylene oxide (desired)
  B. Carbon dioxide and water (not desired)
  C. Unreacted ethylene plus oxygen (not desired)

Selectivity is:
$$\frac{A}{A+B}$$

Conversion is:
$$\frac{A+B}{A+B+C}$$

Yield is:
$$\frac{A}{A+B+C}$$

The foregoing are indicated as major considerations.

However, it may be noted that the ethylene oxide formed might be re-arranged to acetaldehyde, which may be an undesirable side product, or it might be further oxidized; and of course, the ethylene oxide formed can be further oxidized in the system giving carbon dioxide and water.

It is indeed surprising that the very complicated ethylene oxide formation process may be controlled or regulated in such a convenient manner in accordance with the invention, especially when one keeps in mind the many undesirable effects or side reactions that may occur during or simultaneously with the desired partial oxidation reaction; and also when one considers that in experimental runs analagous to the above, the low boiling fluorine compounds were found to be inoperative as inhibitors, such as sulfur hexafluoride, perfluoro ethane, and per fluoro propane.

In view of the foregoing disclosures, variations and modifications thereof will be apparent to one skilled in the art and it is intended to include within the invention all such variations and modifications except as do not come wthin the scope of the appended claims.

We claim:

1. In a process for producing ethylene oxide by the partial oxidation of ethylene by means of gaseous oxygen in the presence of a silver containing catalyst, the improvement which comprises providing in the reaction zone an amount in the range of about 0.01 to 500 p. p. m., based on the gaseous feed mixture, of polytrifluorovinyl chloride, containing about 15 to 30 carbon atoms in the molecule, and having a vapor pressure at 216° C. of 0.075 mm. Hg.

2. In a process for producing ethylene oxide by the partial oxidation of ethylene by means of gaseous oxygen in the presence of a silver-containing catalyst, the improvement which comprises providing in the reaction zone an amount in the range of about 0.01 to 500 p. p. m., based on the gaseous feed mixture, of an organic fluorine-containing compound having an average composition of $C_{21}F_{44}$ and a boiling range of 130 to 240° C. at 10 mm. Hg, whereby excessive formation of carbon dioxide is suppressed.

References Cited in the file of this patent

UNITED STATES PATENTS

| | | |
|---|---|---|
| 2,270,780 | Berl | Jan. 20, 1942 |
| 2,279,469 | Law | Apr. 14, 1942 |
| 2,622,088 | Thomas | Dec. 16, 1952 |

OTHER REFERENCES

McKim et al.: Canadian J. of Research 27 (Sec. B), 826.

Murray: Australian J. Sci. Research 3A, 445–446.